(12) United States Patent
Inaguchi

(10) Patent No.: US 8,763,204 B2
(45) Date of Patent: Jul. 1, 2014

(54) SHOCK ABSORBING DAMPER FOR SLIDING DOOR

(75) Inventor: Yuuzou Inaguchi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 75 days.

(21) Appl. No.: 13/517,727

(22) Filed: Jun. 14, 2012

(65) Prior Publication Data

US 2013/0061425 A1 Mar. 14, 2013

(30) Foreign Application Priority Data

Sep. 12, 2011 (JP) ................. 2011-198754

(51) Int. Cl.
| E05F 5/02 | (2006.01) |
| F16F 13/00 | (2006.01) |
| F16F 9/19 | (2006.01) |

(52) U.S. Cl.
CPC ............. *F16F 13/007* (2013.01); *F16F 9/19* (2013.01)
USPC ............................................. 16/82

(58) Field of Classification Search
CPC ............. F16F 13/007; F16F 9/19; F16F 9/18
USPC ............ 16/85, 82, 83, 84, 49, 51, 52, 53, 56, 16/57, 58, 66; 188/281, 282.1, 282.6, 188/282.8, 283

See application file for complete search history.

(56) References Cited

U.S. PATENT DOCUMENTS

| 4,102,004 A * | 7/1978 | Nagase ............................. 16/49 |
| 7,861,371 B2 * | 1/2011 | Kim ................................. 16/85 |
| 8,468,652 B2 * | 6/2013 | Salice .............................. 16/82 |
| 2010/0170062 A1 * | 7/2010 | Kim ................................. 16/52 |

FOREIGN PATENT DOCUMENTS

| JP | 49-088194 A | 8/1974 |
| JP | 59-164847 A | 11/1984 |
| JP | 4-002766 U | 1/1992 |
| JP | 2003193740 A | 7/2003 |
| JP | 2005230468 A | 9/2005 |
| JP | 2006306574 A | 11/2006 |
| JP | 2008-223456 A | 9/2008 |
| WO | WO 2010118934 A1 * | 10/2010 ................ F16F 9/19 |

OTHER PUBLICATIONS

Office Action corresponding to JP2011-198754, dated Oct. 9, 2012.

* cited by examiner

*Primary Examiner* — Jeffrey O Brien
(74) *Attorney, Agent, or Firm* — Lowe Hauptman & Ham, LLP

(57) ABSTRACT

A shock absorbing damper incorporated into a shock absorbing/door pull-in mechanism includes a piston inside thereof. If the sliding door is moved in a closing direction, one end of a rod connected to the sliding door closes a pressure release hole formed in a central portion of the piston. Then, a resistance to movement of the piston is generated to absorb a shock occurring when the sliding door is closed. On the other hand, if the sliding door is moved in an opening direction, the rod is separated from the piston. As a result, the pressure release hole in the piston is opened and a shock attenuating medium (oil) flows through the pressure release hole and therefore the sliding door moves lightly.

4 Claims, 5 Drawing Sheets

SHOCK ABSORBING DAMPER FOR SLIDING DOOR

RELATED APPLICATIONS

The present application is based on, and claims priority from, Japanese Application Number 2011-198754, filed Sep. 12, 2011, the disclosure of which is hereby incorporated by reference herein in its entirety.

BACKGROUND OF THE INVENTION

1. Field of the Invention

The present invention relates to a damper used for a sliding door shock absorbing mechanism for absorbing a shock occurring when a sliding door mounted to a door frame collides with the door frame.

2. Description of the Related Art

In a machine tool 1 shown in FIG. 1, a working space is covered with a cover 2 and chips and coolant are prevented from spattering around. In this case, for putting in and taking out a workpiece, a sliding door 3 (hereafter referred to as "door") may be provided.

The door 3 of the machine tool may be opened and closed with high frequency of 1000 times a day or more depending on usage and may be opened and closed at high speed so as to increase production efficiency in some cases. Therefore, in order to prevent damage to the door 3 and the cover 2 due to a shock occurring when the door 3 mounted to a door frame is opened or closed and the door 3 collides with the door frame, or in order to prevent the shocks from affecting devices such as a numerical controller 4 disposed on the cover 2, it is necessary to absorb the shocks.

As one of methods of absorbing the shocks, it is effective to mount a shock absorbing damper (a mechanism for absorbing the shock occurring when the door is opened or closed and simultaneously pulling the door in an open or closed end).

An example of use of the shock absorbing damper for a shock absorbing/door pull-in mechanism 5 will be described by using FIGS. 2, 3, and 4.

As shown in FIG. 2, the shock absorbing/door pull-in mechanism 5 is fixed to the door frame 6 by a base plate 7 and includes a shock absorbing damper 8, a cam mechanism 9, and the like.

In FIGS. 2 to 4, a direction of leftward movement of the door 3 is an opening direction of the door.

The shock absorbing/door pull-in mechanism 5 cooperates with a pin 10 mounted to the door 3 to absorb a shock occurring when the door is closed with the shock absorbing damper 8. The shock absorbing damper 8 includes a cylinder 11 and a rod 12 entering and leaving the cylinder 11. As shown in FIG. 3, the cylinder 11 and the rod 12 are disposed so that their axes are aligned with a central axis p set parallel to a sliding direction of the door 3.

The cam mechanism 9 includes a cam 13, a guide groove 14 formed in the base plate 7, a tension spring 15, and the like. As shown in FIG. 4, the cam 13 is formed by connecting a lower jaw portion 16 and an upper engagement portion 17 into a V shape substantially at a base portion 18 and an engagement groove 19 is formed between the jaw portion 16 and the engagement portion 17. A first roller follower 20 is provided at a tip end portion of the jaw portion 16 and a second roller follower 21 is provided at an intermediate portion of the engagement portion 17, and these roller followers are fitted in the guide groove 14. The cam 13 is movably connected to a tip end portion of the rod 12, coaxial with the second roller follower 21, and a front end of the tension spring 15 is locked to the base portion 18. A back end of the tension spring 15 is engaged with a back portion of the base plate 7 and the tension spring 15 is always maintained in a pulled state.

As shown in FIG. 4, the guide groove 14 has a front bent portion 22 bent about 90° downward from a horizontal attitude. A portion of the guide groove 14 behind the front bent portion 22 is a horizontal portion 23. A central axis of the horizontal portion 23 of the guide groove 14 is aligned with the central axis p set parallel to the sliding direction of the door 3.

In an initial stage (FIG. 3) of shock absorbing operation when the door 3 moves in a closing direction and before the door 3 completely closes, the pin 10 mounted to the door 3 comes into the engagement groove 19 of the cam 13 and collides with the engagement portion 17. At this time, the cam 13 is pulled back (rightward) by the tension spring 15 to receive a counterclockwise force about the second roller follower 21 in FIG. 3 and the first roller follower 20 of the jaw portion 16 is fitted in a portion of the guide groove 14 near a bottom portion of the front bent portion 22.

Furthermore, when the door 3 continues to move in the closing direction, the cam 13 rotates clockwise about the second roller follower 21 against tension of the tension spring 15 in FIG. 3 and the first roller follower 20 comes out of the front bent portion 22 of the guide groove 14 and moves to the horizontal portion 23. At the same time, the pin 10 mounted to the door 3 is engaged in a groove bottom (on the base portion 18 side) of the engagement groove 19 of the cam 13 as shown in FIG. 4.

When the door 3 further moves in the closing direction, both the first roller follower 20 and the second roller follower 21 are engaged in the horizontal portion 23 of the guide groove 14 and therefore the cam 13 moves backward while guided by the horizontal portion 23 of the guide groove 14 with an opening of the engagement groove 19 oriented upward. At this time, a piston (not shown) in the shock absorbing damper 8 is moved in an attenuating medium (fluid such as oil) in a pressure chamber by using the rod 12 connected to the cam 13 and kinetic energy of the door 3 is absorbed by means of a flow resistance of the attenuating medium.

In this way, the shock occurring when the door 3 is closed is cushioned. In a final stage of the shock absorbing operation, the kinetic energy of the door 3 reduces to such a level as not to be able to overcome the flow resistance of the attenuating medium. However, because the tension spring 15 grasps the cam 13 and pulls it back to a terminal position, the door 3 can be closed completely.

In opening the door 3, on the other hand, the pin 10 mounted to the door 3 moves the cam 13, engaged with the pin 10, forward (leftward) due to the opening operation of the door 3 and the rod 12 comes out of the cylinder 11 as shown in FIG. 3. Regarding this movement of the rod 12, the rod 12 is allowed to come out of the cylinder 11 lightly by providing a valve mechanism such as a check valve to the piston in the cylinder 11 so as to release the movement of the attenuating medium when the piston moves forward in the attenuating medium in the pressure chamber while restricting the movement of the attenuating medium when the piston moves backward.

The cam 13, which is engaged with the pin 10 and moves as the door 3 moves in the opening direction, rotates counterclockwise about the second roller follower 21 in FIG. 3 and the opening of the engagement groove 19 is oriented forward as the first roller follower 20 is fitted into the front bent portion 22 at the front end of the guide groove 14 or by the action of the tension spring 15. In this state, the pin 10 mounted to the door 3 can easily come forward out of the engagement groove 19 of the cam 13. Then, the pin 10 separates from the cam 13 and the relationship between the shock absorbing damper 8 and the door 3 ends. Therefore, the door 3 can freely move toward the opening direction. The tension spring 15, which has been pulled due to the forward movement of the cam 13, is maintained in the pulled state, because the first roller follower 20 is engaged with the front bent portion 22 of the guide groove 14 and the cam 13 cannot move.

An example of this type of shock absorbing damper is disclosed in Japanese Patent Application Laid-Open No. 2005-230468 and examples of the oil damper for absorbing the shock in the movement of the piston in only one direction by the check valve or the like is disclosed in Japanese Patent Application Laid-Open No. 2003-193740 and Japanese Patent Application Laid-Open No. 2006-306574.

The shock absorbing damper for absorbing the shock in opening or closing of the door needs to reliably absorb the shock in the completely closed position (or in the completely opened position) of the door while providing a small resistance in opening (or in closing) of the door. For this purpose, the damper needs to have such a structure as to resist only the movement of the door in one direction and as not to resist the movement in an opposite direction.

Methods employed in a commercially available shock absorber and a common oil damper are provision of a movable valve element to a piston to increase and decrease a fluid flow path in size (Japanese Patent Application Laid-Open No. 2005-230468, Japanese Patent Application Laid-Open No. 2003-193740) and use of a check valve, including a hole to be closed with a metal ball, for the piston (Japanese Patent Application Laid-Open No. 2006-306574).

However, if the movable valve element is provided or the check valve mechanism is used, a structure for supporting the valve element or the metal ball and a structure for preventing falling of the metal ball are necessary, which complicates shapes of parts and increases cost. Moreover, it is also necessary to swiftly move the door in the opposite opening direction from the completely closed position where the door is under the shock-absorbing action by the damper in order to speed up the opening and closing of the door.

SUMMARY OF THE INVENTION

Therefore, with the above problems in view, the following damper mechanism is proposed.

A rod of the damper and a piston in the damper (a part for generating a resistance in the damper) are separated from each other. A pressure release hole is formed in the piston such that it passes through from one end to the other end of the piston. When the rod is pushed in, a tip end portion of the rod closes the pressure release hole in the piston to give a resistance to movement of the piston. When the rod is pulled out, the rod is separated whether or not the piston follows. In this way, the pressure release hole is opened and an attenuating medium flows back through the pressure release hole so as not to generate the resistance to the movement of the piston.

The damper absorbs the shock by using a turbulent resistance or a viscosity resistance (these resistances are collectively called "flow resistance") of fluid (oil, water, air, or the like) as the attenuating medium and is an oil damper when oil is used. In the damper mechanism, because the piston cannot be pulled by the rod, a biasing member (an elastic body such as a spring and rubber or encapsulated air) for returning the piston to an original position after the rod is pulled out of the cylinder is used. In this case, the flow resistance at the time the piston moves forward (in the opening direction of the door) is considerably reduced by the pressure release hole formed in the piston. On the other hand, when the rod is pushed in, the pressure release hole is closed with the end portion of the rod, the attenuating medium cannot come out through the pressure release hole, and the fluid flows only through an orifice which is provided between an outer periphery of the piston and the cylinder and through which one end of the piston is in communication with the other end. Therefore, an operation resistance (flow resistance) at the time the piston moves backward is large.

The shock absorbing damper for a sliding door according to the present invention is used for absorbing a shock occurring when the sliding door mounted to a door frame collides with the door frame. The shock absorbing damper comprises a cylinder including a pressure chamber filled with an attenuating medium, a piston which is slidable in the cylinder and pressurizes the attenuating medium in the cylinder, a spring for biasing the piston in a direction opposite to a pressurizing direction of the attenuating medium by the piston, a cam which is engaged with a pin mounted to the sliding door, and a rod having one end connected to the cam and the other end inserted into the cylinder. The rod comes in contact with the piston when the rod is pushed into the cylinder as the sliding door moves in an opening or closing direction, whereas the rod separates from the piston when the rod is pulled out of the cylinder as the sliding door moves in the closing or opening direction.

An inner tube may be disposed in the cylinder to partition an inside of the cylinder into the pressure chamber inside the inner tube and a retreat chamber outside the inner tube, and the inner tube may have a front end open into the cylinder and a back end closed with the cylinder and may include an orifice for generating a flow resistance of the attenuating medium between the pressure chamber and the retreat chamber.

A through hole, serving as a pressure release hole, may be formed in the piston at a central portion thereof, along a central axis of the piston, and a plurality of grooves, serving as orifices, may also be formed in the piston on an outer peripheral portion thereof, extending parallel to the central axis, and further the rod may close the pressure release hole when the rod comes in contact with the piston.

In the shock absorbing damper for the sliding door according to the invention, the rod and the piston are separated from each other and the pressure release hole is formed in the piston. Therefore, when the rod is pushed in and moved, the tip end portion of the rod closes the pressure release hole, thereby increasing the resistance of the damper in pushing in the rod. On the other hand, in the movement of the rod in the pulling-out direction, the rod is pulled out prior to the return of the piston. Therefore, the pressure release hole in the piston is opened to reduce the resistance in returning of the piston. In other words, because the pressure release hole is opened and closed by the rod end, the structure becomes simple as compared with the case in which the check valve is used. Moreover, because the rod and the piston are separated from each other, pulling-out of the rod hardly meets with the flow resistance of the attenuating medium. Therefore, in the movement in such a direction (e.g., the opening direction) as to pull out the rod, it is possible to move the door lightly and swiftly.

BRIEF DESCRIPTION OF THE DRAWINGS

The above and other objects and features of the present invention will become apparent from the following description of the embodiments with reference to the accompanying drawings, wherein.

DETAILED DESCRIPTION OF THE PREFERRED EMBODIMENTS

A first embodiment of a shock absorbing damper according to the present invention will be described by using FIGS. 5 to 8.

Figure 1:
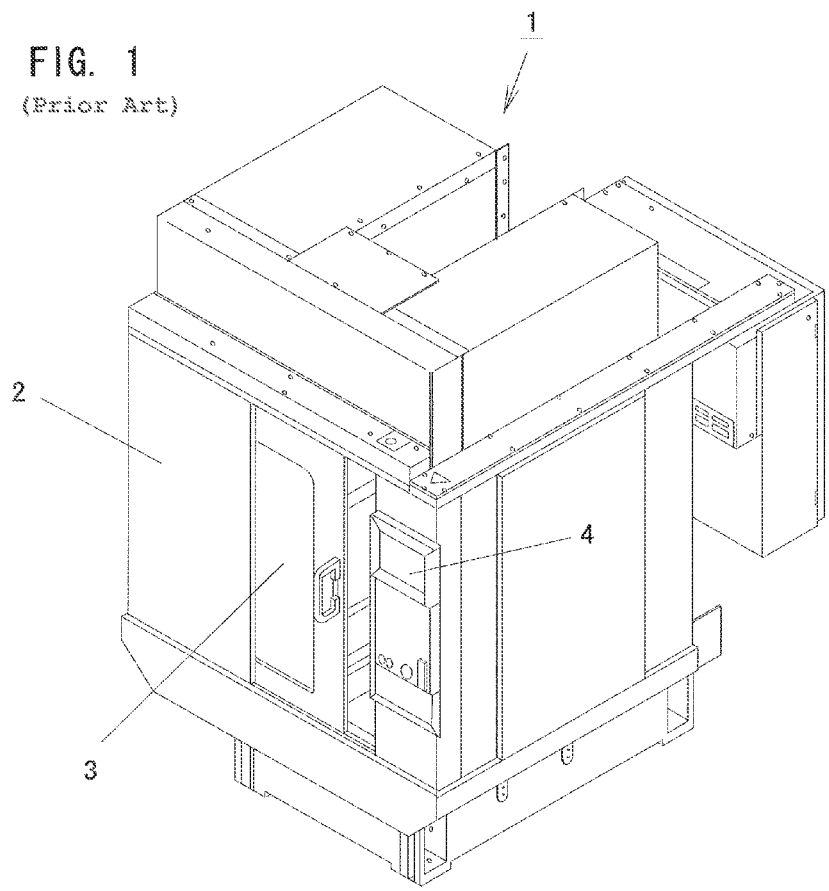
FIG. 1 is a perspective view showing an outward appearance of a machine tool with a working space covered with a sliding cover.
Figure 2:
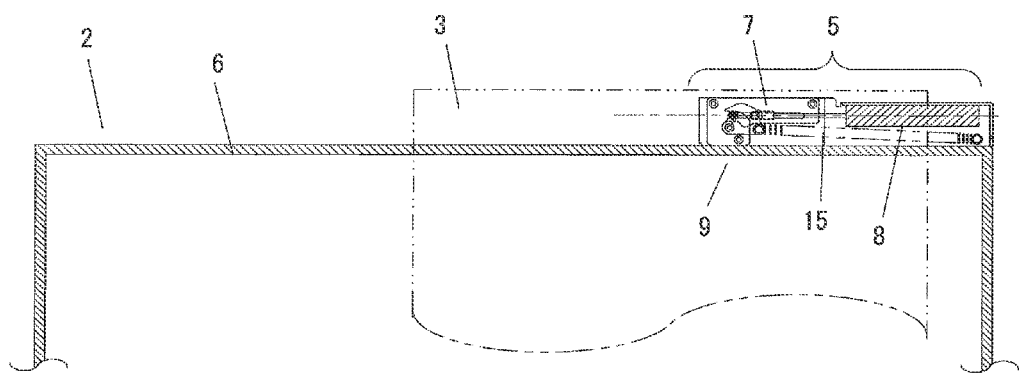
FIG. 2 is a schematic diagram showing a sliding door including a shock absorbing/door pull-in mechanism into which a conventional shock absorbing damper is incorporated.

The shock absorbing damper 24 in the first embodiment is incorporated into the conventional shock absorbing/door pull-in mechanism 5 described above referring to FIGS. 2 to 4, in place of the shock absorbing damper 8 in FIGS. 2 to 4.

The shock absorbing damper 24 includes a cylinder 11, a rod 12, and a piston 25. The cylinder 11 is in a cylindrical shape with a bottom, has an opening on a front side, and includes large-diameter, middle-diameter, and small-diameter internal spaces 26a, 26b, and 26c formed respectively from the opening toward the bottom portion. A rod guide 27 is mounted into a portion extending from the large-diameter portion 26a to a part of the middle-diameter portion 26b in a liquid-tight manner and an accumulator 28 is mounted into a back portion of the middle-diameter portion 26b. The small-diameter portion 26c is formed as a pressure chamber 29 in which a return spring 30 (compression spring) is mounted and in front of which the piston 25 is mounted.

In a central portion of the piston 25, a pressure release hole 31 which is a through hole formed along a central axis is formed. The piston 25 is always biased forward (leftward in FIG. 2) by the return spring 30 and is in contact with a back face of the accumulator 28. Oil which is an attenuating medium is filled in the pressure chamber 29. The rod 12 is disposed so that its central axis is aligned with a central axis p set parallel to a sliding direction of the door 3 (FIG. 3) and the rod 12 can move in the direction of its central axis (i.e., in the direction of the central axis p) while guided by a center of the rod guide 27. Sealing is provided between the rod 12 and the rod guide 27 in a liquid-tight manner. A back end of the rod 12 is in contact with a front face of the piston 25 to close the pressure release hole 31.

Figure 6:
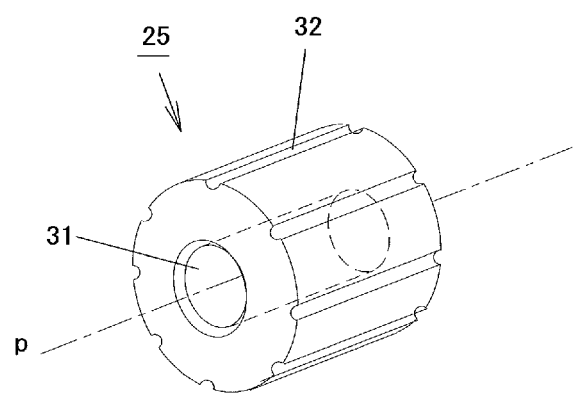
FIG. 6 is a perspective view of a piston incorporated into the shock absorbing damper for the sliding door in FIG. 5.

On an outer peripheral face of the piston 25 facing a cylinder inner wall, a plurality of groove-shaped orifices 32 extending parallel to the central axis p are formed from a front end to a back end as shown in FIG. 6. Size of the orifices 32 is determined based on magnitude and speed of the shock to be absorbed, viscosity of the attenuating medium, and the like.

The accumulator 28 includes a movable seal plate 33 and an internal spring 34 in the embodiment and the movable seal plate 33 is pushed backward by the action of the internal spring 34 to be engaged with a step portion between the middle-diameter portion 26b and the small-diameter portion 26c.

Figure 3:
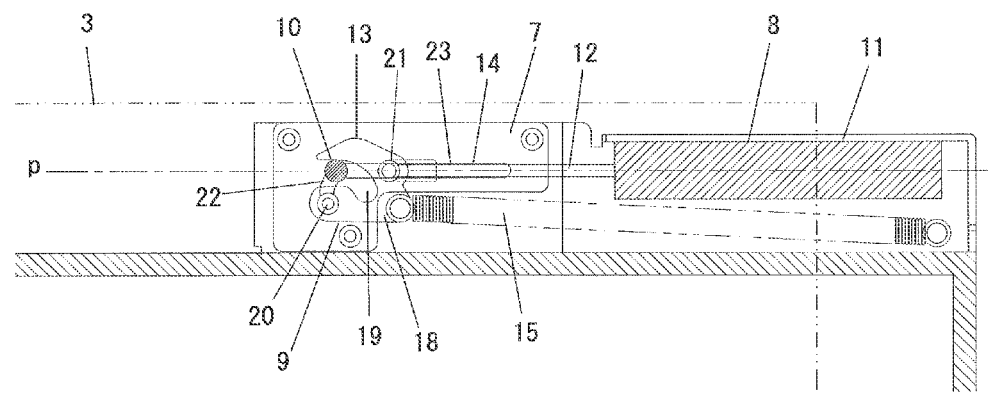
FIG. 3 is a front view for explaining the shock absorbing/door pull-in mechanism (in a state of an initial stage of shock absorbing operation) in FIG. 2.
Figure 5:
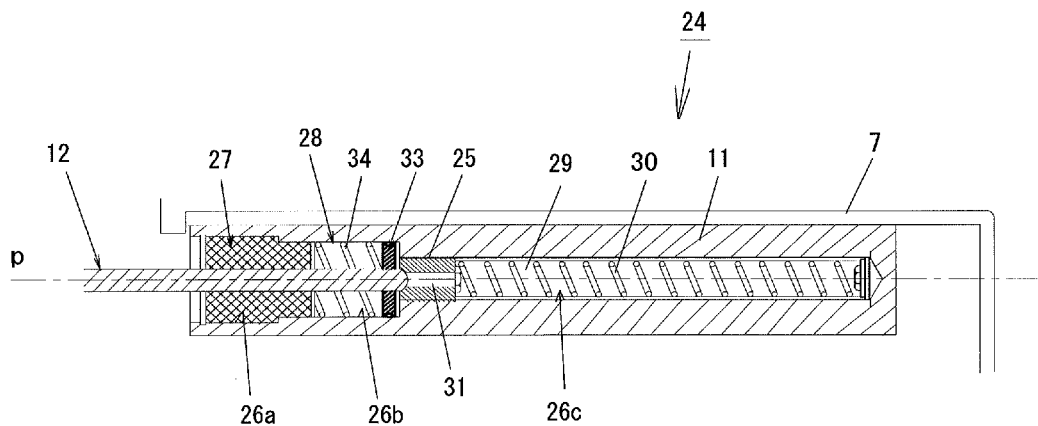
FIG. 5 is a partial sectional view of a first embodiment of a shock absorbing damper (in a state of an initial stage of shock absorbing operation) for a sliding door according to the invention, incorporated into the shock absorbing/door pull-in mechanism in FIGS. 3 and 4.

The shock absorbing damper 24 shown in FIG. 5 is in a state of an initial stage of shock absorbing operation at the time the door 3 (see FIG. 3) moves in the closing direction but before the door 3 completely closes. In this state, as shown in FIG. 3, the pin 10 mounted to the door 3 has reached the cam 13 connected to the rod 12, the rod 12 is pushed backward by the movement of the door 3 in the closing direction, and the back end portion of the rod 12 closes the pressure release hole 31 in the piston 25 as shown in FIG. 5.

If the door 3 further moves in the closing direction from this state, the rod 12 causes the piston 25 to move to a back portion of the pressure chamber 29 while compressing the return spring 30. At this time, because the pressure release hole 31 in the piston 25 is closed with the back end portion of the rod 12, the attenuating medium (oil) in the pressure chamber 29 flows through the orifices 32 on the outer periphery of the piston 25 and moves to a front side of the piston 25. Kinetic energy of the door 3 in the closing direction is consumed by a flow resistance of the fluid (oil) and a resistance of the return spring 30 at this time and the shock of the moving door is absorbed. With the number and flow path sectional areas of orifices 32 and the viscosity of the attenuating medium, moving speed of the piston 25 in the shock absorption is adjusted.

Figure 4:
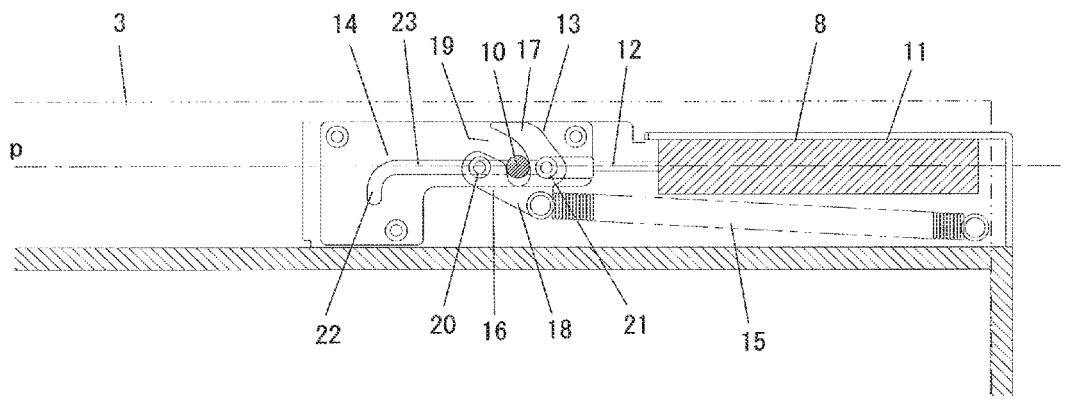
FIG. 4 is a front view for explaining the shock absorbing/door pull-in mechanism (in a state of a middle stage of the shock absorbing operation) in FIG. 2.

In the final stage of the movement of the door 3 in the closing direction, the kinetic energy of the door 3 becomes almost lost and the closing movement stops. However, the cam 13 (see FIG. 3) is always biased backward by the tension spring 15 as described above and therefore the door 3 is completely closed by the biasing force of the tension spring 15 as shown in FIG. 4.

Figure 7:
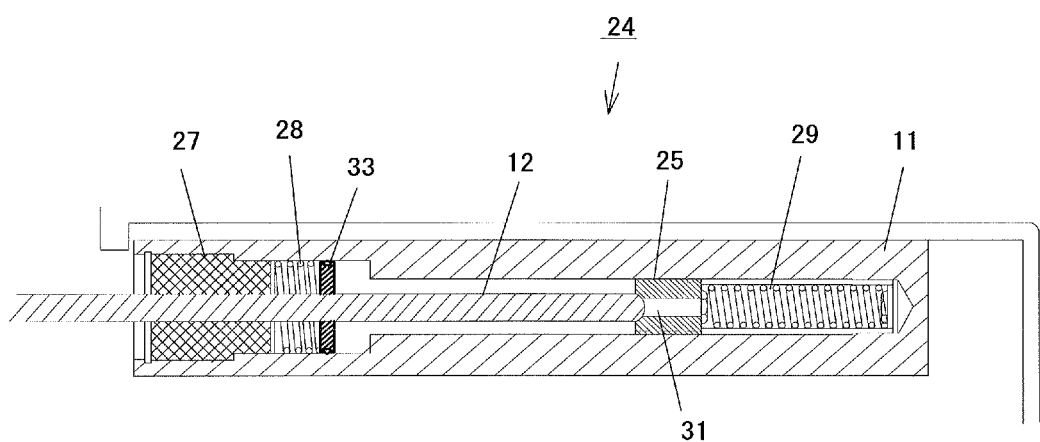
FIG. 7 is a partial sectional view of the first embodiment of the shock absorbing damper (in a state of a final stage of the shock absorbing operation) for the sliding door according to the invention.

If the door 3 moves in the closing direction, as shown in FIG. 7, the rod 12 comes into the pressure chamber 29 and therefore a volume of the space in the pressure chamber 29 reduces by the volume of the rod 12. Then, the volume of the attenuating medium (oil) which corresponds to the reduced volume retreats to the front side of the piston 25 while pushing the movable seal plate 33 of the accumulator 28 forward.

Figure 8:
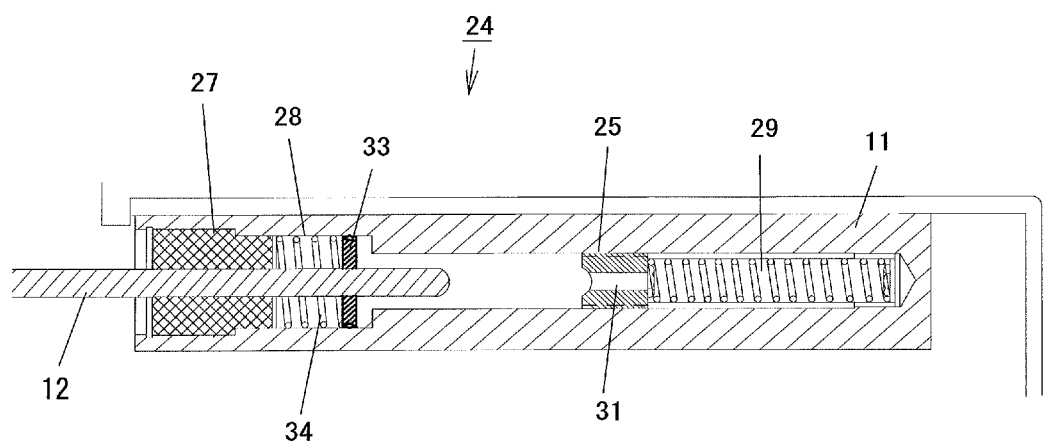
FIG. 8 is a partial sectional view of the first embodiment of the shock absorbing damper (during movement of the door in an opening direction) for the sliding door according to the invention.

If the door 3 is moved in the opening direction, the rod 12 is pulled out of the cylinder 11 by the cam 13. Then, because the rod 12 is merely in contact with the piston 25, the rod 12 separates from the piston 25 and moves forward whether or not the piston 25 follows the rod 12. The rod 12 moves lightly at this time, because the rod 12 is not affected by the flow resistance of the attenuating medium (oil) as shown in FIG. 8. Therefore, the door 3 moves lightly and swiftly in the opening direction. As the door 3 moves in the opening direction, the cam 13 moves forward in the guide groove 14 and stops when the first roller follower 20 of the cam 13 is fitted into the front bent portion 22 of the guide groove 14. As a result, the coming-out movement of the rod 12 stops as well. Then, the cam 13 is disengaged from the pin 10 and the door 3 freely moves to the completely open position.

On the other hand, the piston 25 is pushed back forward while biased by the return spring 30. At this time, the piston 25 is separated from the rod 12 and therefore the pressure release hole 31 is open. As a result, the flow resistance of the attenuating medium is small and the piston 25 can move lightly and swiftly.

Part of the attenuating medium which has retreated to the space (in front of the piston 25) formed by pushing the movable seal plate 33 forward is returned to its original position due to reduction of pressure in the pressure chamber 29 caused by coming out of the rod 12. As a result, the movable seal plate 33 moves backward and is engaged with the step portion (between the middle-diameter portion 26b and the small-diameter portion 26c) at which the movable seal plate 33 originally was.

Then the series of shock absorbing operation and door opening operation finish. The state of the shock absorbing damper 24 at this time is the same as the initial state of the shock absorbing operation of the shock absorbing damper 24 shown in FIG. 5.

A second embodiment of the shock absorbing damper according to the invention will be described by using FIG. 9.

Similarly to the shock absorbing damper 24 in the first embodiment, a shock absorbing damper 35 in the second embodiment is incorporated into the conventional shock absorbing/door pull-in mechanism 5 described above referring to FIGS. 2 to 4, in place of the shock absorbing damper 8 in FIGS. 2 to 4. Therefore, components common to the structure of the first embodiment will be described schematically by using the same reference numerals.

The shock absorbing damper 35 includes a pressure chamber 29 formed by using an inner tube 36 inside a cylinder 11 having a cylindrical shape with a bottom and a return spring 30 and a piston 25 mounted in the pressure chamber 29. The piston 25 includes, in its central portion, a pressure release hole 31 which is a through hole formed along a central axis. However, orifices are not formed (see the orifices 32 in FIG. 6) on an outer peripheral face of the piston 25.

The inner tube 36 partitions the inside of the cylinder 11 into the pressure chamber 29 (an inside of the inner tube 36) and a retreat chamber 37 (an outside of the inner tube 36). A back end of the inner tube 36 is closed with a bottom wall of the cylinder 11. On the other hand, a front end of the inner tube 36 is open and the retreat chamber 37 and a space in front of the piston 25 communicate with each other. An attenuating medium (oil) is filled in the entire cylinder 11 including the pressure chamber 29 and the retreat chamber 37 and some orifice holes 38 connecting the pressure chamber 29 and the retreat chamber 37 are formed in a cylindrical wall of the inner tube 36.

The cylinder 11 includes a large-diameter portion 26a, a middle-diameter portion 26b, and a small-diameter portion 26c. A rod guide 27 is mounted into a portion extending from the large-diameter portion 26a on an opening side to an intermediate portion of the middle-diameter portion 26b. An accumulator 28 is mounted into the middle-diameter portion 26b. And the pressure chamber 29 and the retreat chamber 37 are formed by the inner tube 36 in the small-diameter portion 26c.

A rod 12 is inserted into the rod guide 27 in a liquid-tight manner and a back end portion of the rod 12 comes in contact with a front end face of the piston 25 to close the pressure release hole 31 in the piston 25.

Figure 9:
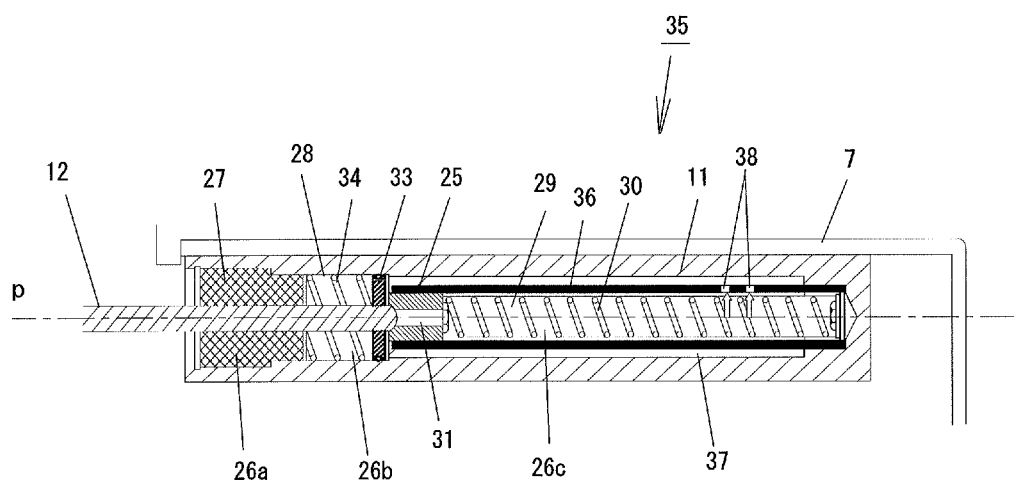
FIG. 9 is a partial sectional view of a second embodiment of the shock absorbing damper (in a state of an initial stage of shock absorbing operation) for the sliding door according to the invention, incorporated into the shock absorbing/door pull-in mechanism in FIGS. 3 and 4.

The shock absorbing damper 35 shown in FIG. 9 is in a state of an initial stage of shock absorbing operation at the time the door 3 moves in a closing direction but before the door 3 completely closes. In this state, the pin 10 mounted to the door 3 has reached the cam 13 connected to the rod 12 as shown in FIG. 3.

If the door 3 further moves in the closing direction from this state and the rod 12 is pushed backward, the piston 25 moves backward while the pressure release hole 31 in the piston 25 is closed with the back end portion of the rod 12. As a result, the attenuating medium flows to the retreat chamber 37 side through the orifice holes 38 in the inner tube 36. With a flow resistance at this time, shock absorption is carried out. A reduction in a volume of a space in the cylinder 11 due to the rod 12 coming into the cylinder 11 is cancelled out by contraction of the accumulator 28 by a volume corresponding to the reduction in the volume of the space (corresponding to a volume of the rod 12 coming into the cylinder 11).

Operation of each portion at the time the door 3 moves in the opening direction is similar to that in the first embodiment. The rod 12 moves earlier in such a direction as to separate from the piston 25 and come out of the piston 25 whether or not the piston 25 follows the rod 12. As a result, the pressure release hole 31 in the piston 25 is opened and the piston 25 is allowed to move lightly forward by the return spring 30. Due to reduction in pressure in the pressure chamber 29 caused by the rod 12 separating from the piston 25 and coming out of the piston 25 and moving in front of the piston 25, the attenuating medium which has moved to the retreat chamber 37 flows back into the pressure chamber 29 from the front side of the piston 25 through the pressure release hole 31 and the accumulator 28 restores its shape. Then, the door 3 is released from the cam 13 and freely moves to an open end.

In the structure in which the shock absorbing damper 35 in the second embodiment is used for the shock absorbing/door pull-in mechanism 5, the back end portion of the rod 12 opens and closes the pressure release hole 31 formed in the piston 25 and therefore the shock in the closing direction of the door 3 is reliably absorbed and the door 3 moves lightly in the opening direction. Because the back end portion of the rod 12 opens and closes the pressure release hole 31 formed in the piston 25 to carry out the shock absorption and deactivate the flow resistance of the attenuating medium, a valve structure in the shock absorbing damper 35 is simple.

By adjusting sectional areas of the orifice holes 38 and viscosity of the attenuating medium, a degree of the shock absorption can be adjusted.

Figure 10:
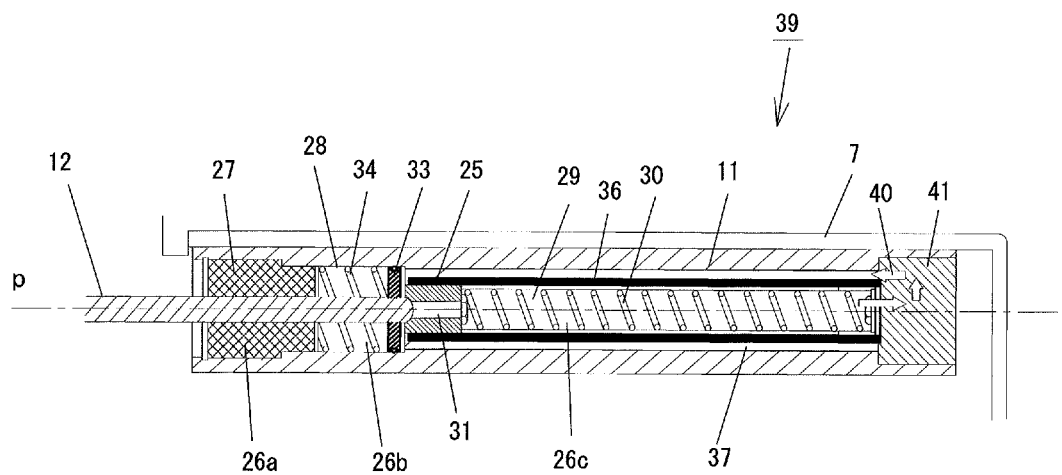
FIG. 10 is a partial sectional view of a third embodiment of the shock absorbing damper (in a state of an initial stage of shock absorbing operation) for the sliding door according to the invention, incorporated into the shock absorbing/door pull-in mechanism in FIGS. 3 and 4.

A third embodiment of the shock absorbing damper according to the invention will be described by using FIG. 10.

Similarly to the shock absorbing dampers in the first embodiment and the second embodiment, a shock absorbing damper 39 in the third embodiment is incorporated into the conventional shock absorbing/door pull-in mechanism 5 described above referring to FIGS. 2 to 4, in place of the shock absorbing damper 8 in FIGS. 2 to 4. Therefore, components common to the structures of the first embodiment and the second embodiment will be described schematically by using the same reference numerals.

The shock absorbing damper 39 includes a cylinder 11, a rod guide 27, an accumulator 28, an inner tube 36, a rod 12, a piston 25, and a return spring 30. The inner tube 36 is disposed in the cylinder 11 to partition an inside of the cylinder 11 into a pressure chamber 29 (an inside of the inner tube 36) and a retreat chamber 37 (an outside of the inner tube 36). In the pressure chamber 29, the return spring 30 and the piston 25 are disposed. The rod 12 is inserted into the rod guide 27 in a liquid-tight manner and a back end portion of the rod 12 is in contact with a front end face of the piston 25. In a central portion of the piston 25, a pressure release hole 31 which is a through hole formed along a central axis is formed. The piston 25 is pushed by the return spring 30 and in contact with a back end portion of the rod 12 and therefore the pressure release hole 31 in the piston 25 is closed with the back end portion of the rod 12.

In the third embodiment, a rear opening of the cylinder 11 is closed with a plug body 41 having an orifice passage 40. The orifice passage 40 connects the pressure chamber 29 and the retreat chamber 37. An attenuating medium (oil) is filled in an entire internal space of the cylinder 11 including the pressure chamber 29 and the retreat chamber 37.

A back end of the inner tube 36 is in contact with and closed with the plug body 41 and the inner tube 36 has a gap between its front end and a back end face of the accumulator 28. The gap connects the retreat chamber 37 and a front side of the piston 25.

In the structure in which the shock absorbing damper 39 in the third embodiment is used for the shock absorbing/door pull-in mechanism 5, similarly to the second embodiment, the shock occurring when the door 3 is closed can be absorbed by a flow resistance of the attenuating medium generated when the piston 25 is pushed by the rod 12 and moves backward in the pressure chamber 29. At this time, because the back end portion of the rod 12 closes the pressure release hole 31 formed in the piston 25 and moves the piston 25 backward, the attenuating medium flows into the retreat chamber 37 through the orifice passage 40 provided in the plug body 41 at a back end thereof. The flow resistance at this time absorbs the shock occurring when the door 3 is closed. Operation and a function of the accumulator 28 are similar to those in the second embodiment.

Operation of each portion when the door 3 moves in the opening direction is similar to that in the second embodiment. The rod 12 moves earlier in such a direction as to separate from the piston 25 and come out of the piston 25 whether or not the piston 25 moves. As a result, the pressure release hole 31 in the piston 25 is opened and the piston 25 is allowed to move forward by the return spring 30. Therefore, the attenuating medium flows back into the pressure chamber 29 from the retreat chamber 37 side through the front side of the piston 25 and the pressure release hole 31.

In the structure in which the shock absorbing damper 39 in the third embodiment is used for the shock absorbing/door pull-in mechanism 5, similarly to the first embodiment and the second embodiment described above, the shock occurring when the door 3 is closed can be absorbed reliably and the door 3 can be returned swiftly. At the same time, the pressure release hole 31 in the piston 25 is opened and closed by the rod 12 and therefore application of the resistance to the piston by the attenuating medium and deactivation of the resistance can be carried out with a simple valve structure.

Although each of the shock absorbing dampers according to the above-described embodiments is applied to the sliding door provided to the cover covering the working space of the machine tool, the shock absorbing damper according to the invention is applied not only to the sliding door provided to the cover covering the working space of the machine tool but also to common sliding doors.

Although each of the shock absorbing dampers according to the above-described embodiments is described as a damper used for absorbing the shock generated at the position where the sliding door is completely closed after the door moves in the closing direction, each of the shock absorbing dampers may have a structure which is used for absorbing a shock generated at a position where the sliding door is completely opened after the door moves in the opening direction.

The orifices for increasing the flow resistance in order to absorb the shock occurring when the sliding door is completely closed or completely opened may be formed on an inner face of the pressure chamber 29 or may be a thin through hole formed in the piston 25.

Various structures can be considered for the accumulator for canceling out the reduction of the space in the pressure chamber 29 due to the rod 12 coming into the pressure chamber 29 and the structure is acceptable as far as it contracts due to increase in the pressure caused by the reduction of the space, restores its original state when the increase in the pressure is released, has durability, and can maintain liquid-tightness in the cylinder 11.

The invention claimed is:

1. A shock absorbing damper for a sliding door, for absorbing a shock occurring when the sliding door mounted to a door frame collides with the door frame, the shock absorbing damper comprising:
    a cylinder including a pressure chamber filled with an attenuating medium;
    a piston which is slidable in the cylinder and pressurizes the attenuating medium in the cylinder;
    a spring for biasing the piston in a direction opposite to a pressurizing direction of the attenuating medium by the piston;
    a cam which is engageable with a pin mounted to the sliding door; and
    a rod having one end connected to the cam and the other end inserted into the cylinder,
    wherein
    the rod comes into contact with the piston when the rod is pushed into the cylinder as the sliding door moves in an opening direction or a closing direction whereas the rod is separated from the piston when the rod is pulled out of the cylinder as the sliding door moves in the closing direction or the opening direction,
    a through hole, which is a pressure release hole, is formed in the piston at a central portion thereof, along a central axis of the piston, and
    the rod closes the pressure release hole when the rod comes in contact with the piston to prevent the attenuating medium from passing through the pressure release hole.

2. The shock absorbing damper for a sliding door according to claim 1,
    wherein an inner tube is disposed in the cylinder to partition an inside of the cylinder into the pressure chamber inside the inner tube and a retreat chamber outside the inner tube, and
    the inner tube has a front end open into the cylinder and a back end closed with the cylinder and includes an orifice for generating a flow resistance of the attenuating medium between the pressure chamber and the retreat chamber.

3. The shock absorbing damper for a sliding door according to claim 1,
    wherein a plurality of grooves are formed in the piston on an outer peripheral portion thereof, the plurality of grooves extending parallel to the central axis and defining orifices for generating a flow resistance of the attenuating medium.

4. The shock absorbing damper for a sliding door according to claim 1, wherein the sliding door is a sliding door provided to the door frame of a cover covering a working space of a machine tool.

* * * * *